United States Patent
Nakamura

Patent Number: 5,952,807
Date of Patent: Sep. 14, 1999

[54] TRACING CONTROL METHOD AND APPARATUS

[75] Inventor: Hisanori Nakamura, Toyota, Japan

[73] Assignee: Toyota Jidosha Kabushiki Kaisha, Toyota, Japan

[21] Appl. No.: 08/721,449

[22] Filed: Sep. 27, 1996

[30] Foreign Application Priority Data

Sep. 28, 1995 [JP] Japan .................................. 7-251436

[51] Int. Cl.[6] .................................................. G05B 19/25
[52] U.S. Cl. ....................... 318/570; 318/568.1; 318/601; 364/474.29
[58] Field of Search ................................... 318/560–600, 318/601–605; 364/474.01–474.37

[56] References Cited

U.S. PATENT DOCUMENTS

| | | | |
|---|---|---|---|
| 3,066,868 | 12/1962 | Tripp . | |
| 4,060,755 | 11/1977 | Robillard | 318/571 |
| 4,503,493 | 3/1985 | Burckhardt et al. | 318/572 |
| 4,558,977 | 12/1985 | Inoue et al. | 318/572 |
| 4,700,118 | 10/1987 | Kishi et al. | 318/568 |
| 4,703,443 | 10/1987 | Moriyasu | 364/559 |
| 5,029,096 | 7/1991 | Itaba | 364/474.29 |

FOREIGN PATENT DOCUMENTS

| | | |
|---|---|---|
| 102219 | 3/1984 | European Pat. Off. . |
| 240048 | 10/1987 | European Pat. Off. . |
| 364057 | 4/1990 | European Pat. Off. . |

*Primary Examiner*—David Martin
*Attorney, Agent, or Firm*—Pillsbury Madison & Sutro LLP

[57] ABSTRACT

A tracing control method includes the steps of (a) controlling a movement direction of a move point to a tangential direction of an objective locus at a present position of the move point and (b) moving the move point in the movement direction at a non-controlled speed. A tracing control apparatus includes (a) a direction control actuator for controlling a movement direction of a move point and (b) a drive actuator for driving the move point at a non-controlled speed.

6 Claims, 7 Drawing Sheets

(PRIOR ART)

TRACING CONTROL METHOD AND APPARATUS

The priority application, Japanese Patent Application No. HEI 7-251436, filed in Japan on Sep. 28, 1995, is hereby incorporated by references into the subject application.

BACKGROUND OF THE INVENTION

1. Field of the Invention

The present invention relates to a tracing control method and apparatus for causing a move point, which conducts the same movement as that of a locus tracer, to correctly trace an object locus. The method and apparatus can be applied to machine tools and robots, etc. The move point exhibits the same movement as a tool in a case where the method and apparatus is applied to machine tools, and that of a robot hand in a case where the method and apparatus is applied to robots.

2. Description of Related Art

Figure 9:
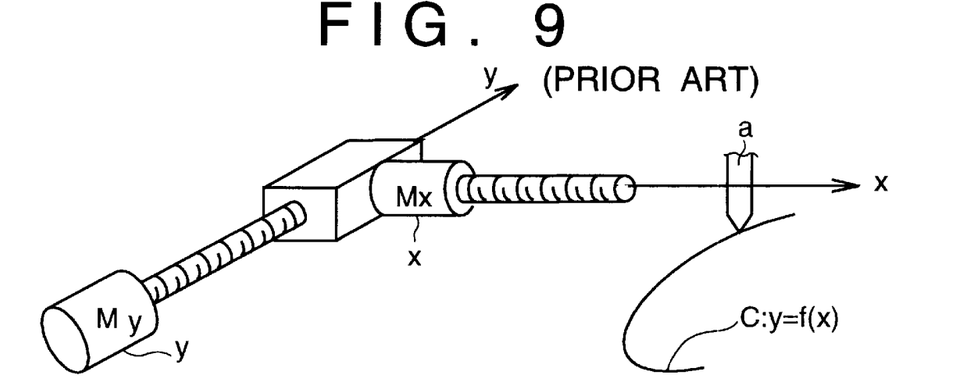
FIG. 9 is a schematic oblique view of a conventional tracing control apparatus.
Figure 10:
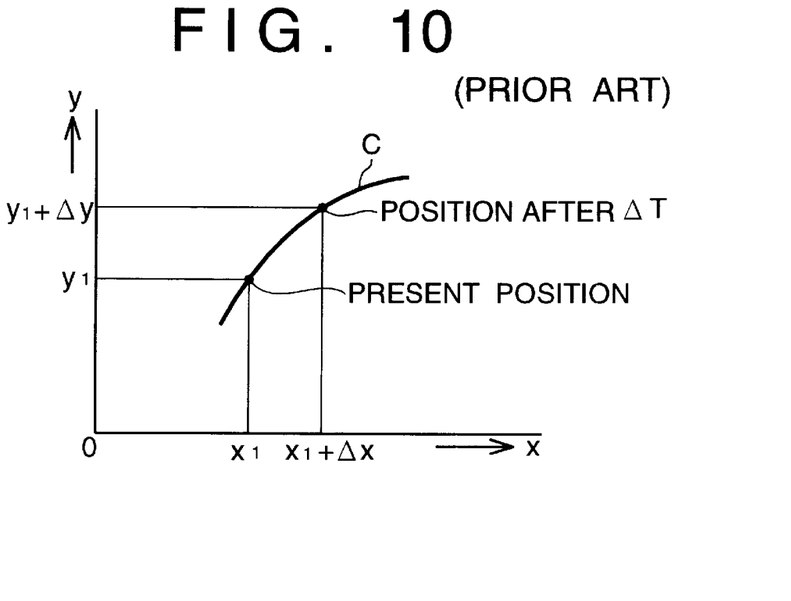
FIG. 10 is a graph showing a portion of a locus drawn by the conventional apparatus of FIG. 9.
Figure 11:
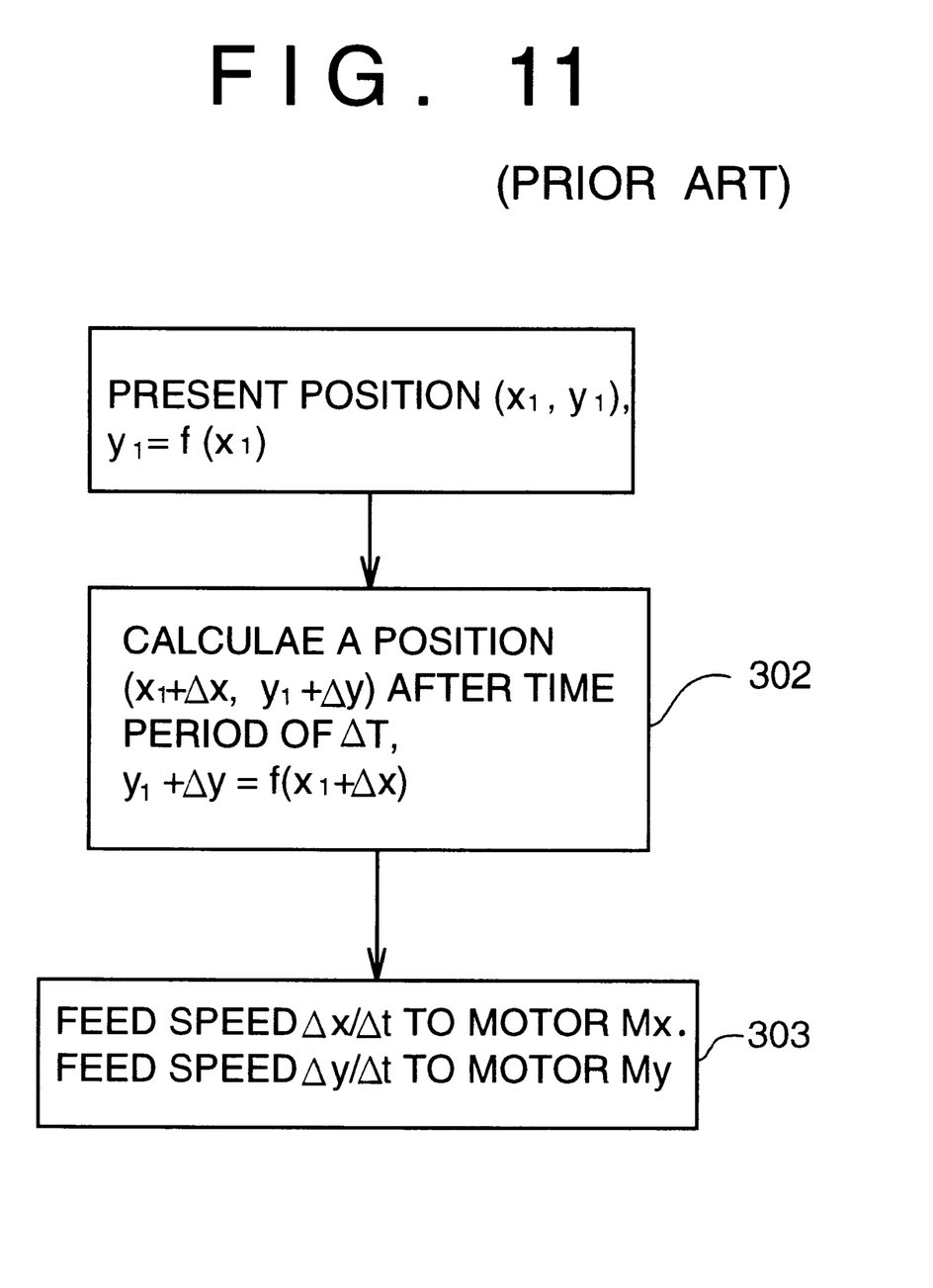
FIG. 11 is a flow chart of a conventional tracing control method.

FIGS. 9–11 illustrate a conventional tracing control method and a typical structure therefor, taking a model for tracing a locus C:y=f(x) drawn on a two-dimensional plane as an example for simplifying the explanation. In FIG. 9, a tracer a is moved in directions x and y by motors Mx and My, respectively, via ball screws, etc. In FIG. 10, position (x1, y1) is a present position of the tracer, and position (x1+$\Delta$x, y1+$\Delta$y) is a position where the tracer is required to be moved after the time period of $\Delta$t.

In the conventional control method, as shown in FIG. 11, at step 302, the positional element (y1+$\Delta$y) is calculated by the following equation:

$$y1+\Delta y = f(x1+\Delta x)$$

and a differential from the present position is calculated as ($\Delta$x, $\Delta$y).

Then, required drive speeds $\Delta$x/$\Delta$t and $\Delta$y/$\Delta$t in x and y directions, respectively, are calculated as step 303, and the calculation results are fed to drive motors Mx and My. Then, the drive motors Mx and My are synchronously driven at speeds $\Delta$x/$\Delta$t and $\Delta$y/$\Delta$t, respectively so that locus C is drawn by the tracer a.

However, the conventional control methods and apparatus have the following problems.

First, at a high speed and high load operation (for example, a state during machining in the case of a machine tool), the locus tracer deviates from an objective locus C, and the tracer cannot trace locus C.

Second, in the case of a two-dimensional and three-dimensional operation, two and three factors, respectively, need to be controlled, which is a accompanied by a cost increase.

The reasons for the generation of the above-described problems are as follows:

With respect to the first problem, in the conventional control method, locus C cannot be traced correctly if any one of the x-axis drive speed $\Delta$x/$\Delta$t and the y-axis drive speed $\Delta$y/$\Delta$t changes non-synchronously. At a high speed and high load operation, resistance acting on the tracer is large, which is likely to generate changes in the drive speeds.

With respect to the second problem, in the conventional control method, factors to be controlled in a two-dimensional operation are $\Delta$x/$\Delta$t and $\Delta$y/$\Delta$t and the number of the factors is two, and factors to be controlled in a three-dimensional operation are $\Delta$x/$\Delta$t, $\Delta$y/$\Delta$t and $\Delta$z/$\Delta$t and the number of the factors is three. Therefore, the same number of factors as that of dimensions need to be controlled.

SUMMARY OF THE INVENTION

An object of the present invention is to provide a tracing method and apparatus which can cause a move point (conducting the same movement as that of a tracer) to correctly trace an objective locus and, in addition, can decrease the number of factors to be controlled compared with the number of factors controlled in the conventional control method.

A method and apparatus according to the present invention are as follows:

A tracing control method for causing a move point to trace an objective locus according to the present invention includes repeating a cycle which includes the following steps of (a) controlling a movement direction of the move point to a tangential direction of the objective locus at a present position of the move point on the objective locus, and (b) moving the move point in the movement direction at a non-controlled speed by a predetermined distance.

A tracing control apparatus for causing a move point to trace an objective locus according to the present invention includes (a) a first actuator for controlling a movement direction of the move point, (b) a second actuator for moving the move point in the movement direction at a non-controlled speed by a predetermined distance, and (c) a direction control computer for determining, at each of points on the locus distanced at the predetermined distance, a tangential direction of the objective locus at a present position of the move point and feeding a value of the tangential direction to the first actuator so that the movement direction of the move point at the present position is to be controlled to the tangential direction by the first actuator.

In the above-described method and apparatus according to the present invention, only the movement direction of the move point is to be controlled, and a movement speed of the move point and synchronization in operation between the first actuator and the second actuator are not necessary. Therefore, independently of a magnitude of the speed and the load of the operation, it is possible to cause the move point to correctly trace the objective locus, by controlling the movement direction of the move point only. Further, because the movement direction is determined by the number of factors less by one than the number of degrees of freedom of the move point, the number of parameters to be controlled is less by one than the number of parameters controlled in the conventional method. As a result, the number of actuators and control devices are decreased and cost decrease is attained.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENT

Figure 1:
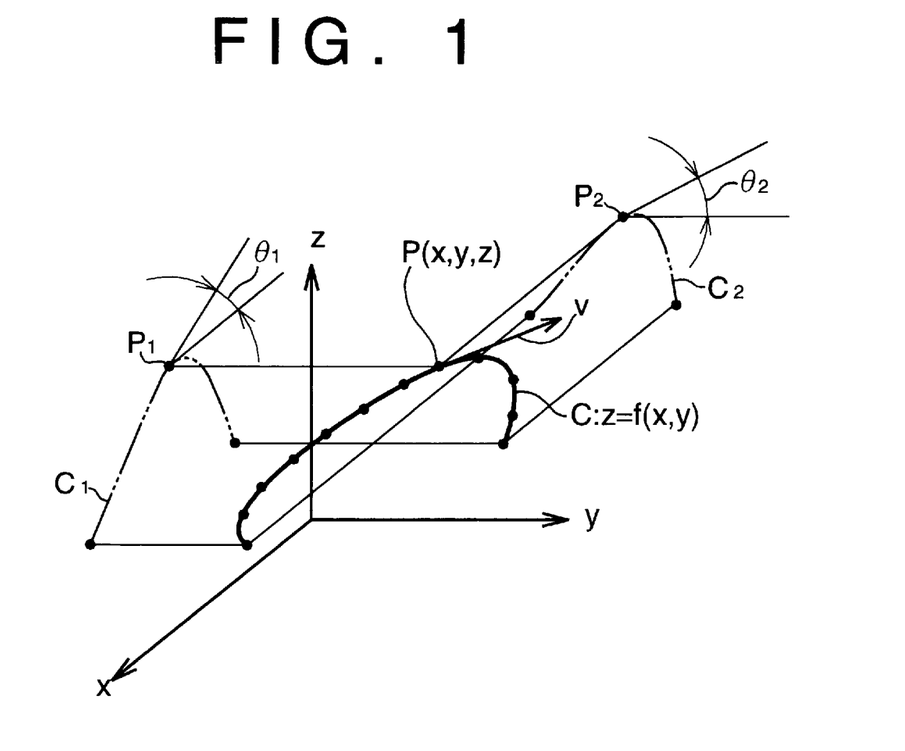
FIG. 1 is an oblique view of a three-dimensional objective locus used for explanation of a tracing control method and apparatus according to any embodiment of the present invention.
Figure 7:
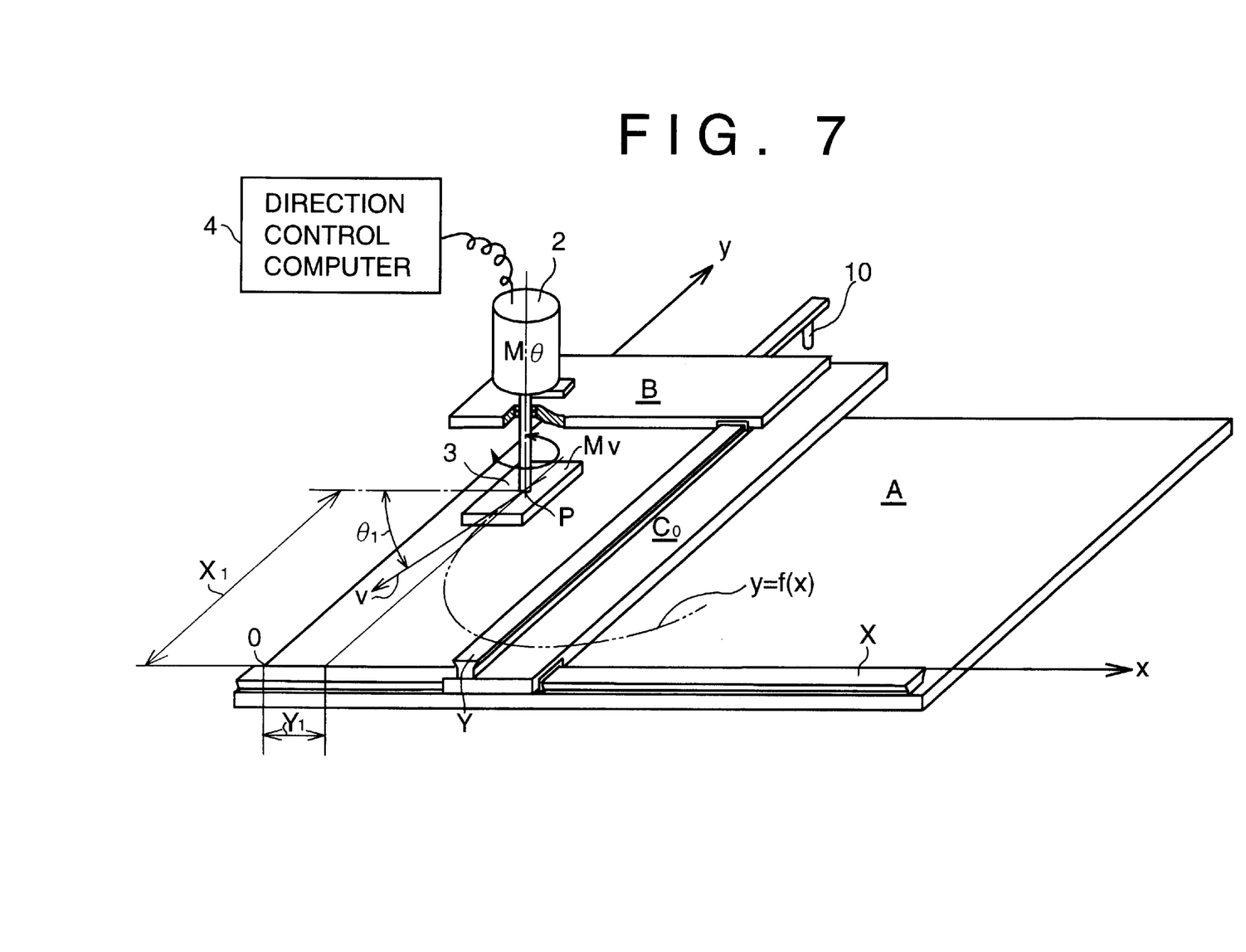
FIG. 7 is an oblique view of the tracing control apparatus according to the second embodiment of the present invention.
Figure 8:
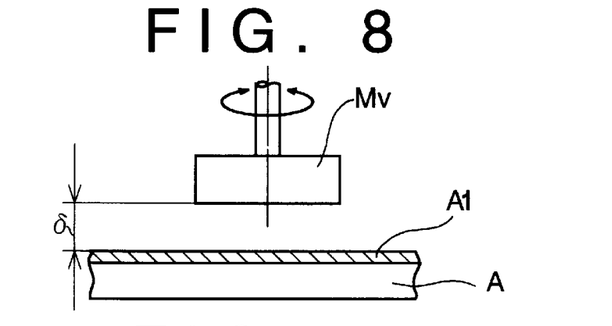
FIG. 8 is a side view of a coil and portions adjacent the coil of the apparatus of FIG. 7.

FIG. 1 illustrates a principle used in a tracing control method and apparatus according to the present invention; FIGS. 2–6 illustrate a tracing control method and apparatus according to a first embodiment of the present invention; and FIGS. 7 and 8 illustrate a tracing control method and apparatus according to a second embodiment of the present invention. Portions common to the first embodiment and the second embodiment of the present invention are denoted with the same reference numerals or characters throughout the first embodiment and the second embodiment of the present invention.

First, the principle used in the tracing control method and apparatus according to the present invention will be explained with reference to FIG. 1.

In FIG. 1, a tangential direction of a locus intended to be traced (hereinafter, objective locus) C:z=f(x, y) at a present or instant position of a move point P is $$(\partial z/\partial x, \partial z/\partial y, \partial z/\partial z)=(\theta_1, \theta_2, 1)$$

With curve C, the following differential relationship holds.

$$dz=(\partial z/\partial x)\cdot dx+(\partial z/\partial y)\cdot dy=\theta_1\cdot dx+\theta_2\cdot dy$$

so that $$z=\int \theta_1 dx+\int \theta_2 dy$$

If $\theta_1$ and $\theta_2$ are given, curve C:z=f(x, y) is determined without any condition. Therefore, a move point P can trace curve C by only being moved in the direction $(\theta_1, \theta_2, 1)$, without controlling the movement speed of point P.

In this instance, factors to be controlled are only $\theta_1$ and $\theta_2$, and thus, the number of the factors is two. This number (two) is less by one than the number (three) of the control factors $(\partial x/\partial t, \partial y/\partial t, \partial z/\partial t)$ controlled in the conventional tracing control method.

Portions of a method and apparatus common to the first embodiment and the second embodiment of the present invention will now be explained with reference to, for example, FIGS. 2 and 3.

Figure 2:
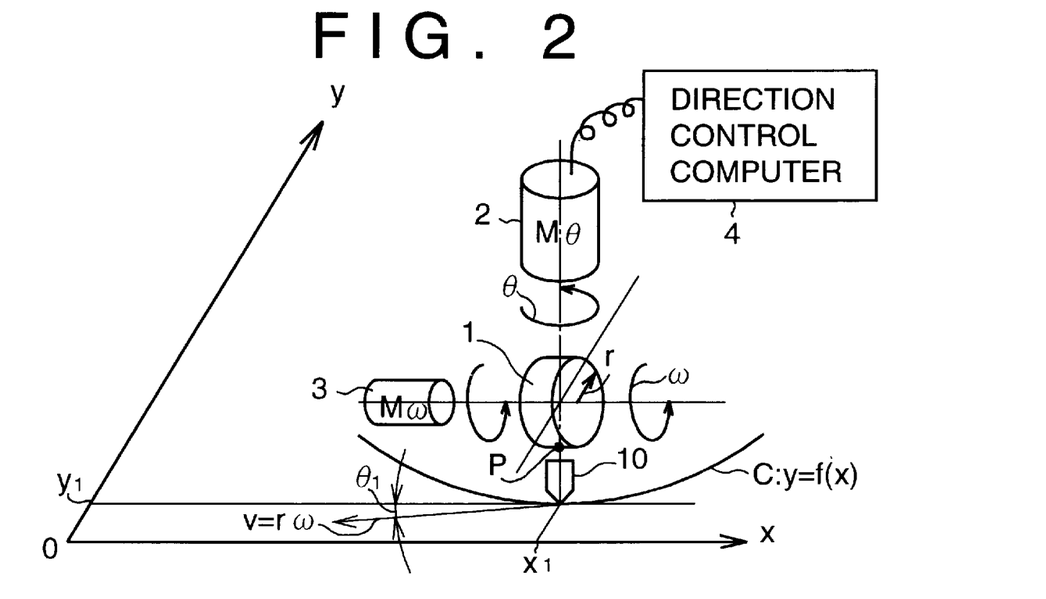
FIG. 2 is a schematic view of a tracing control apparatus according to a first embodiment of the present invention.

In FIG. 2, the move point P which conducts the same movement as a movement of a tracer 10 (a tool in a case of a machine tool and a robot hand in a case of a robot) is a point on a wheel 1 having a radius r. A movement direction of the move point P is controlled by a movement direction control actuator 2 (a first actuator) which is, for example, an electric motor Mθ. The move point P is moved in the movement direction by a drive actuator 3 (a second actuator) which is, for example, an electric motor Mω. A direction control computer 4 determines by calculation, at each of points on the objective locus distanced at predetermined distance intervals, a tangential direction of the objective locus at a present position of the move point P and feeds a value of the tangential direction to the movement direction control actuator 2. When an angle θ about a z-axis of the wheel 1 having a radius r rotates at an angular speed ω on an x-y plane, the tracer 10 located on an axis of the wheel 1 moves, like the move point P, in the direction θ at a speed of v=rω on the x-y plane so that the tracer and the move point P correctly trace the objective locus C.

Figure 3:
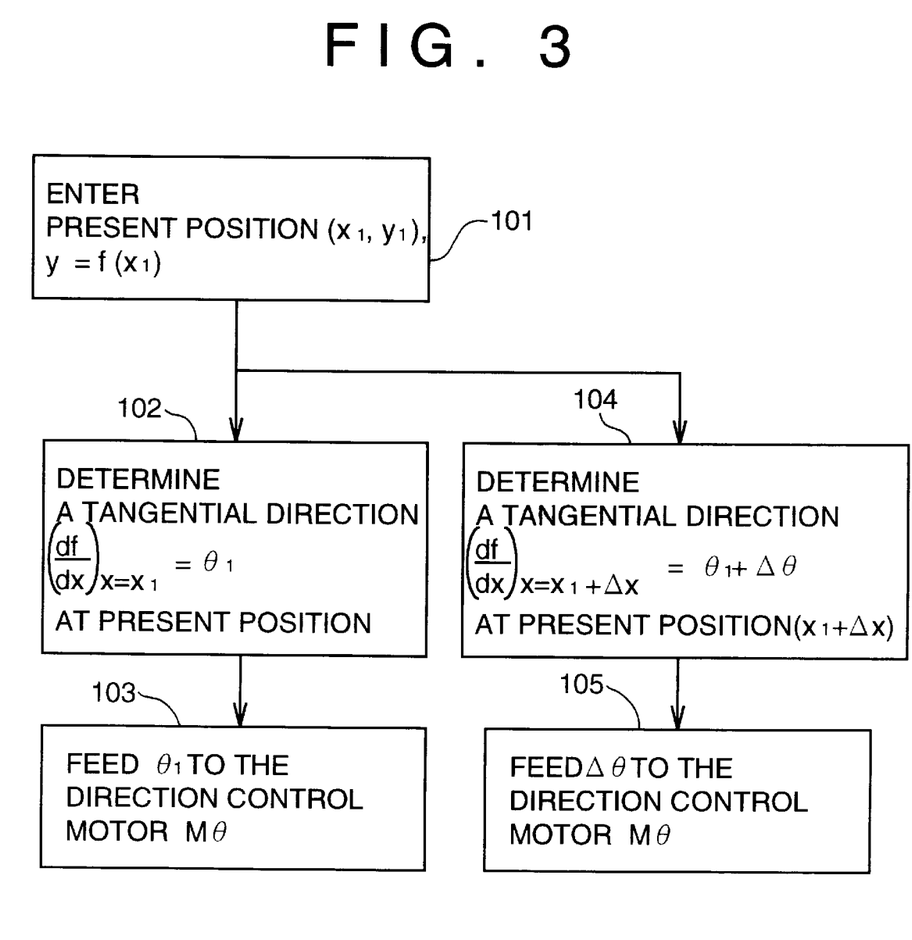
FIG. 3 is a flow chart illustrating a tracing control method according to any of the first embodiment and a second embodiment of the present invention.

FIG. 3 illustrates a flow chart according to which the tracing control method according to the present invention is conducted. The flow chart is stored as a program in the direction control computer 4.

The present position of the move point P on the objective locus C is (x1, y1). Since the point is on curve C, there is the following relationship between x1 and y1:

$$y1=f(x1)$$

This is shown in step 101 of FIG. 3. Then, a direction $\theta_1$ of a tangent of the objective locus C at the point (x1, y1) is determined from equation $$\theta_1=(df/dx)x=x1$$

This is shown in step 102 of FIG. 3. Then, the value $\theta_1$ is fed to the direction control actuator 2 (motor Mθ) so that the actuator 2 controls the movement direction of the move point P (wheel 1) to $\theta_1$ (see step 103 of FIG. 3). Under this state, the drive actuator 3 (motor Mω) is operated to cause the move point P to trace the locus C. In this instance, the speed of the motor Mω is not controlled.

The steps 102 and 103 may be replaced by steps 104 and 105. In that case, if a point to which the move point P is intended to be positioned after a time period Δt is (x1+Δx, y1+Δy), a tangential direction $(\theta_1+\Delta\theta)$ of the objective line at that point is determined by $$\theta_1+\Delta\theta=(df/dx)x=x2$$

where, $x2=x1+\Delta x$ as shown in step 104 of FIG. 3. By feeding the value to the direction control actuator 2 only (step 105), the move point P can trace the objective locus C without controlling the drive actuator 3 (motor Mω).

In any case, the factor to be controlled is a factor to be fed to the motor Mθ only. A drive power only is to be given to the motor Mω, and speed control of the motor Mω is not needed.

Portions unique to each embodiment of the present invention will now be explained.

Figure 4:
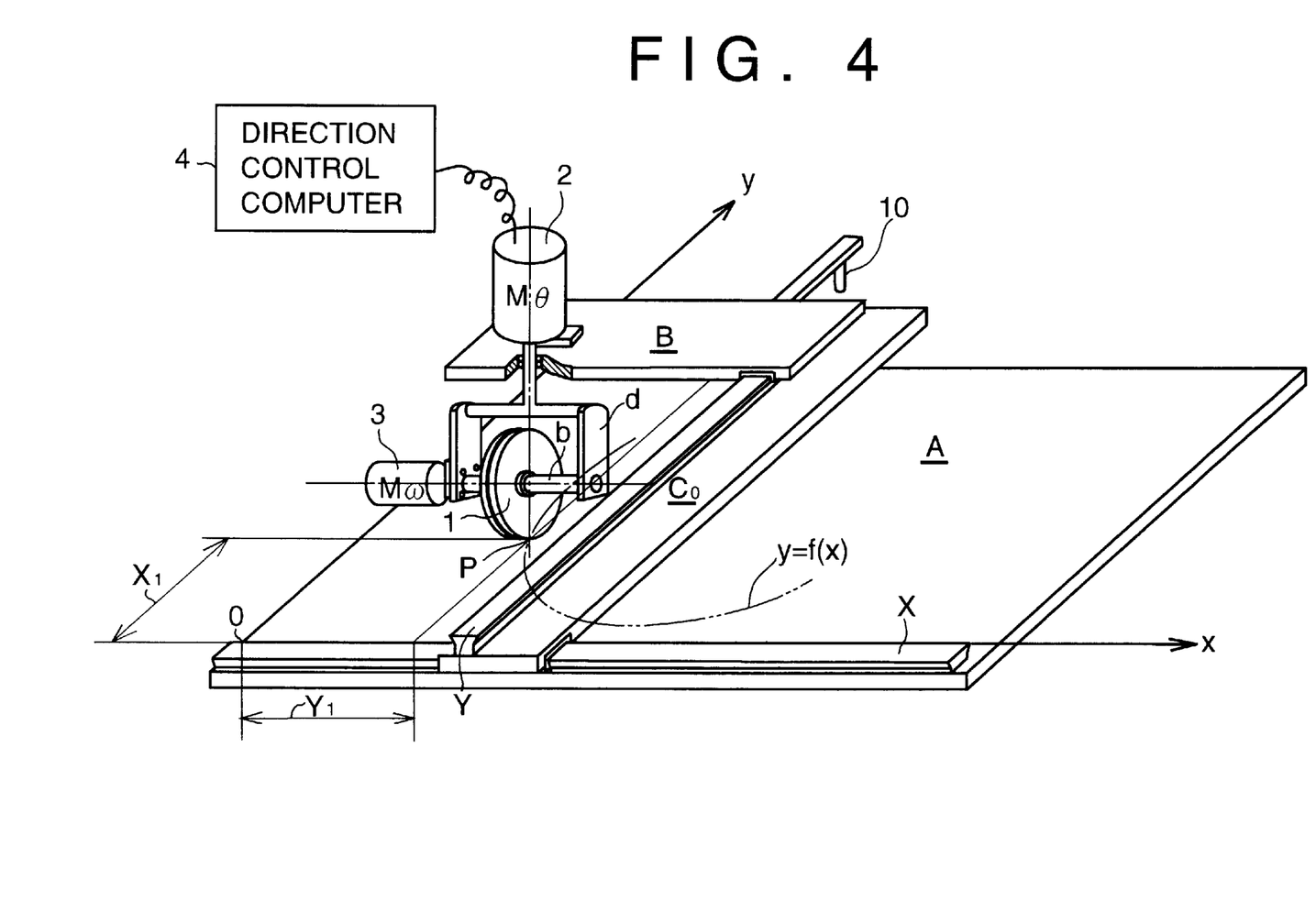
FIG. 4 is an oblique view of a tracing control apparatus according to a fourth embodiment of the present invention.
Figure 5:
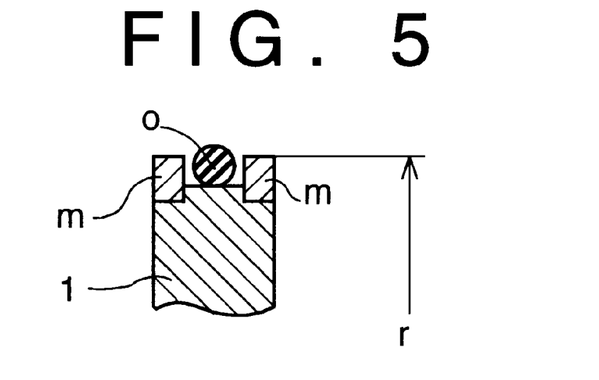
FIG. 5 is a partial, cross-sectional view of a wheel of the apparatus of FIG. 4.
Figure 6:
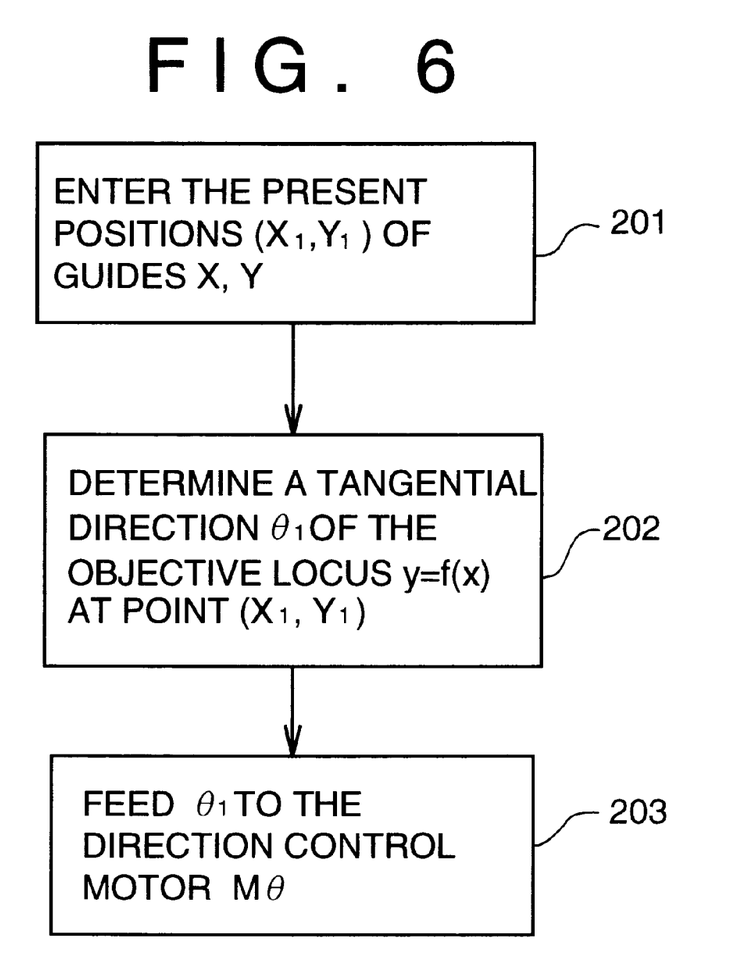
FIG. 6 is a flow chart of the tracing control method according to the first embodiment of the present invention.

In the first embodiment of the present invention, as illustrated in FIGS. 4–6, the drive motor Mω gives a torque to the wheel 1 (corresponding to the move point P) via a bearing or shaft b. The direction control motor Mθ gives a steering force to the wheel 1 via a bearing d. The motor Mω is fixedly coupled to the bearing d, and the motor Mθ is fixedly coupled to a surface plate B. The surface plate B is movable relative to a surface plate Co in a y-direction guided by a guide Y, having a linear scale. The surface plate Co is movable relative to a surface plate A in an x-direction guided by a guide X, having a linear scale. The wheel 1 moves on the surface plate A in the direction θ controlled by the motor Mθ and driven at an arbitrary angular speed ω by the motor Mω. Thus, the wheel 1 moves in the direction θ at an arbitrary (non-controlled) speed v=rω (where, r is a radius of the wheel) on the surface plate A.

As illustrated in FIG. 5, the wheel 1 is provided with magnets m mounted to an outside surface of the wheel 1 and a slippage prevention ring (rubber ring) o is disposed between the magnets for preventing slippage of the wheel relative to the surface plate A. The wheel 1 contacts the surface plate A via the rubber ring o. When the magnets m are attracted to the surface plate A, the rubber ring o is deformed, so that a frictional force proportional to the attraction force is generated between the rubber ring o and the surface plate A thereby preventing the wheel 1 from slipping relative to the surface plate A.

A control method of FIG. 6 is conducted in the above-described structure. The control routine is stored in the direction control computer 4. First, the present position (X1, Y1) of the guides X and Y detected by the linear scales are entered at step 201. Then, a tangent $\theta_1$ of the objective locus C(y=f(x)) at the point (X1, Y1) is determined at step 202. Then, an electric current proportional to $\theta_1$ is fed to the direction control motor Mω at step 203. Keeping this state, the drive motor Mω is operated to move the move point P by a small distance. Then, the routine returns to step 201 and the above-described cycle is repeated so that the move point P traces the objective locus C. When the move point P traces the locus C, the tracer 10 which conducts the same movement as the move point P traces the locus C.

When the drive speed is high and it is desired to determine the position of the move point after a time period of Δt beforehand, the control is conducted according to steps 104 and 105.

In the second embodiment of the present invention, as illustrated in FIGS. 7 and 8, a movable coil Mv of the induction linear motor (a secondary coil) is substituted for the wheel 1 of FIG. 4. A primary winding (a primary coil) A1 is attached to the surface plate A. The coil Mv is given a steering angle θ from the direction control motor Mθ proportional to a movement in the steering direction.

The coil Mv is given an accelerating force (acceleration) via a gap between the primary winding A1 and the coil Mv. More particularly, the coil Mv is given an acceleration in the θ-direction and is moved at a speed of v=∫v1dt (t is integrated from 0 to t1, where t1 is an acceleration time period).

Therefore, according to the same control method as FIG. 6, the same effect as in the first embodiment of the present invention can be obtained. In addition, because no frictional force acts between the wheel 1 and the surface plate A, mechanical life of the apparatus is prolonged.

According to the present invention, the following advantages are obtained:

According to the method of the present invention, since the move point is moved in the tangential direction of the objective locus from the present position of the move point, it is possible to cause the move point to trace the objective locus independently of a speed of movement of the move point, and further it is possible to decrease the number of factors to be controlled by one, as compared with the conventional method.

According to the apparatus of the present invention, since the direction control actuator and the direction control computer are provided, it is possible to cause the move point to move in the direction of the objective locus from the present position of the move point. As a result, it is possible to cause the move point to trace the objective locus independently of a speed of movement of the move point, and further it is possible to decrease the number of factors to be controlled by one, as compared with the conventional method.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A tracing method for causing a move point to trace an objective locus comprising repeating a cycle including the steps of:

controlling a movement direction of the move point to a tangential direction of the objective locus at a present position of the move point on the objective locus; and moving the move point in the movement direction by a predetermined distance;

wherein the number of directional parameters to be controlled in an N-dimensional field is one less than N, where N is 2 or 3.

2. A tracing control apparatus for causing a move point to trace an objective locus comprising:

a first actuator for controlling a movement direction of the move point;

a second actuator for moving the move point in the movement direction by a predetermined distance; and a direction control computer for determining, at each of points on the locus distanced at the predetermined distance, a tangential direction of the objective locus at a present position of the move point, said computer being constructed and arranged to feed a value of the tangential direction to said first actuator so that the movement direction of the move point at the present position is controlled to the tangential direction by said first actuator, wherein the number of directional parameters to be controlled in an N-dimensional field is one less than N, where N is 2 or 3, wherein the directional control computer causes said first actuator to adjust the movement direction of the move point between movements of the move point caused by the second actuator.

3. An apparatus according to claim 2, further comprising first, second and third surface plates wherein said first actuator is coupled to the first surface plate, said first surface plate being movable relative to the second surface plate by a first guide having a scale in a first direction, said second surface plate being movable relative to the third surface plate by a second guide having a scale in a second direction perpendicular to said first direction.

4. An apparatus according to claim 2, wherein a wheel provides movement of the move point touching the objective locus, said second actuator is an electric motor for rotating said wheel, and said first actuator is an electric motor for steering said wheel.

5. An apparatus according to claim 4, wherein a magnet and a slippage prevention ring are mounted to an outer surface of said wheel.

6. An apparatus according to claim 2, wherein a movable coil of an induction linear motor provides movement of the move point touching the objective locus, said coil being coupled to said first actuator so that said coil is given a steering angle from said first actuator, and a primary coil winding is attached to a surface plate on which the objective locus is drawn.

* * * * *